United States Patent [19]
Troutman, Jr.

[11] Patent Number: 5,555,670
[45] Date of Patent: Sep. 17, 1996

[54] SUBMERSIBLE OBJECT WITH BAIT COMPARTMENT FOR A ATTRACTING FISH

[76] Inventor: Richard V. Troutman, Jr., 879 Charlotte, Stephenville, Tex. 76401

[21] Appl. No.: 307,514

[22] Filed: Sep. 16, 1994

[51] Int. Cl.⁶ ................................................. A01K 97/02
[52] U.S. Cl. ........................................ 43/44.99; 114/300
[58] Field of Search .................... 43/42.06, 41, 44.99, 43/55, 54.1; 206/315.11; 114/294, 300

[56] References Cited

U.S. PATENT DOCUMENTS

| | | | |
|---|---|---|---|
| 455,758 | 7/1891 | Moulsong. | |
| 1,800,692 | 4/1931 | Mahan | 43/44.99 |
| 2,415,742 | 2/1947 | Hiltabidel | 43/42.06 |
| 2,465,127 | 3/1949 | Stark | 43/4 |
| 2,614,358 | 10/1952 | Adams | 43/55 |
| 2,713,744 | 7/1955 | Strausser | 43/44.99 |
| 2,961,994 | 11/1960 | Kopietz | 43/44.99 |
| 3,431,879 | 3/1969 | Westling | 114/206 |
| 3,916,556 | 11/1975 | Armanno | 43/42.06 |
| 4,138,794 | 2/1979 | Chiodini | 43/43.14 |
| 4,638,588 | 1/1987 | Abadie | 43/44.99 |
| 4,744,167 | 5/1988 | Steele | 43/42.06 |
| 5,272,829 | 12/1993 | Roberts | 43/44.99 |
| 5,321,906 | 6/1994 | Bommarito | 43/44.99 |

FOREIGN PATENT DOCUMENTS

| | | | |
|---|---|---|---|
| 0403272 | 5/1970 | Australia | 43/44.99 |
| 2126061 | 3/1984 | United Kingdom | 43/44.99 |

*Primary Examiner*—Jack W. Lavinder
*Assistant Examiner*—James Miner
*Attorney, Agent, or Firm*—Melvin A. Hunn; Mark D. Perdue

[57] ABSTRACT

An anchor includes an anchor or weighted portion shaped to engage the bottom of a body of water. An upstanding shank in the form of a hollow cylinder extends from the anchor portion. The interior of the cylinder defines a bait compartment to receive a quantity of fish-attracting material. A removable cap closes the hollow shank to secure the fish-attracting material in the bait compartment. A ring is secured to the shank for attachment to an anchor line or chain. The shank is provided with at least one perforation to permit the fish-attracting material to mix with water surrounding the anchor.

9 Claims, 2 Drawing Sheets

SUBMERSIBLE OBJECT WITH BAIT COMPARTMENT FOR A ATTRACTING FISH

BACKGROUND OF THE INVENTION

1. Field of the Invention

The present invention relates generally to submersible apparatus having a compartment for receiving bait or fish-attracting material. More specifically, the present invention relates to an anchor for anchoring a vessel and attracting fish to an area proximate the vessel.

2. Background Information

For years it has been a common practice to chum fishing waters with pieces of bait fish, offal, blood, and the like to attract fish and aquatic life to a fishing area. Most commonly, chumming is accomplished by manually distributing the fish-attracting material over the surface of the water. This method is effective for attracting fish to the surface of the water, but the fish-attracting material sinks below the surface of the water at a relatively slow rate due to its light weight, and thus does not attract deeper water species.

Others have attempted to solve the problem of placing fish-attracting material at or near the bottom of a body of water. U.S. Pat. No. 455,758, Jul. 14, 1891 to Moulsong discloses a bait cage that is attached to an anchor chain and suspended under water by a rope and pulley apparatus. This apparatus, because it is used in conjunction with an anchor and with a separate suspension device, is cumbersome in operation and provides, in addition to an anchor, a separate large device that would not be convenient in a small fishing vessel. U.S. Pat. No. 2,465,127, Mar. 22, 1949 to Stark discloses a device for attracting fish that is connected into a fishing line intermediate a sinker and the fisherman. The device includes an interior chamber adapted to hold a scented fluid that is attractive to fish and a plurality of fish hooks are secured to the exterior of the device. The device is provided with a valve, wherein the scented fluid is released when the fisherman pulls on the fishing line. Again, this device requires a separate component (the sinker) to submerge the apparatus containing fish-attracting material. U.S. Pat. No. 2,614,358 discloses a cylindrical, perforated chum pot and bait bucket, the cover of which can be removed to function as a bottom sounder. U.S. Pat. No. 4,138,794 discloses a combination sinker and bait juice dispenser having a weight between four and six ounces. A sponge is provided in the interior of the sinker to absorb bait juice. A spring-loaded mechanism is provided for selective compression of the sponge to increase its absorption of bait juice.

None of these disclosures address the need for a single, integrated anchor apparatus for a vessel that is provided with a bait compartment for receiving a fish-attracting material without the need for separate containers, sinkers and the like.

SUMMARY OF THE INVENTION

It is a general object of the present invention to provide an apparatus for anchoring a vessel and attracting fish to an area proximate the vessel. This and other objects of the invention are achieved by providing an anchor comprising an anchor or weighted portion shaped to engage the bottom of a body of water. An upstanding shank in the form of a hollow cylinder extends from the anchor portion. The interior of the cylinder defines a bait compartment to receive a quantity of fish-attracting material. A removable cap closes the hollow shank to secure the fish-attracting material in the bait compartment. A ring is secured to the shank for attachment to an anchor line or chain. The shank is provided with at least one perforation to permit the fish-attracting material to mix with water surrounding the anchor.

According to the preferred embodiment of the present invention, the weighted anchor portion is mushroom-shaped.

According to the preferred embodiment of the present invention, the removable cap comprises a threaded plug received in the hollow cylinder. The ring is secured to the threaded plug.

DESCRIPTION OF THE PREFERRED EMBODIMENT

Figure 1:
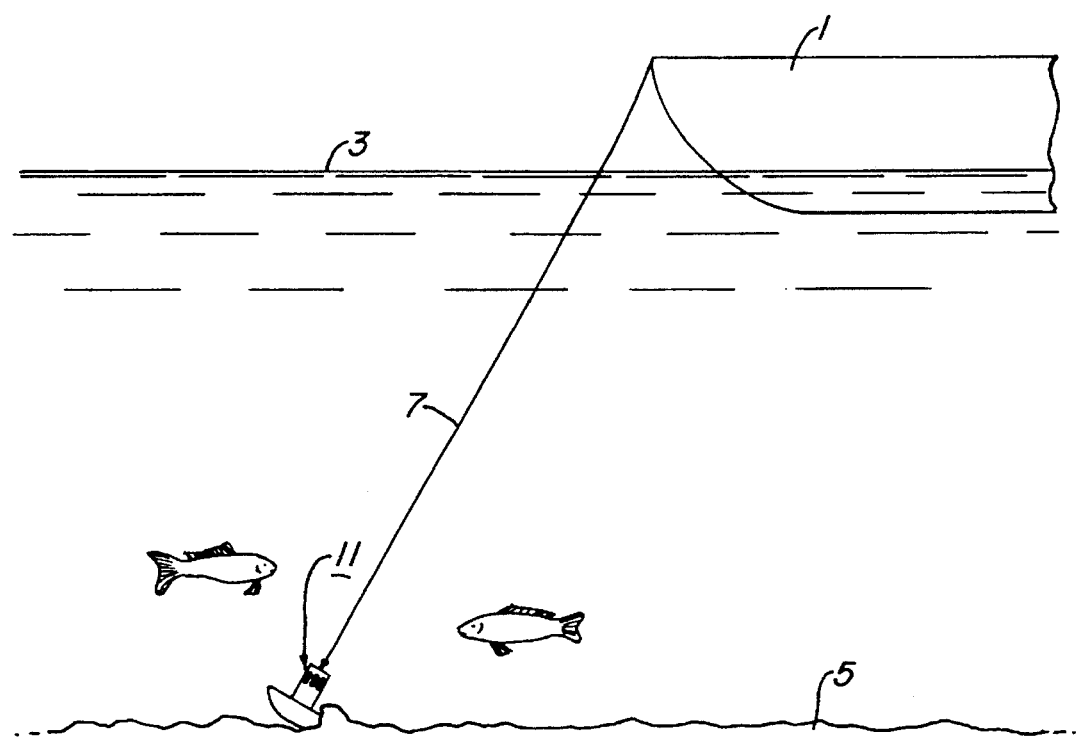
FIG. 1 is an elevation view illustrating the anchor according to the present invention in operation.

Referring to the Figures, and in particular to FIG. 1, a vessel 1, typically a light fishing boat, is depicted floating in a body of water 3. Vessel 1 is anchored to bottom 5 of body of water 3 by an anchor line or chain 7 terminating in a submerged anchor 11 according to the present invention.

Figure 2:
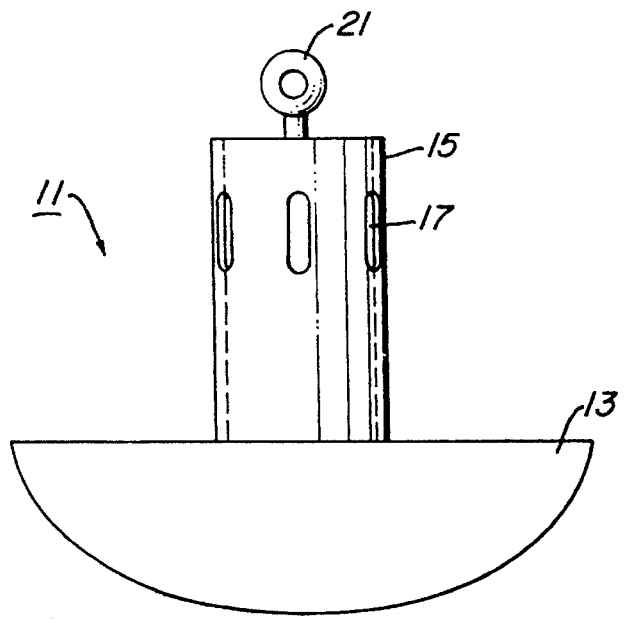
FIG. 2 is an elevation view of the anchor according to the present invention.
Figure 3:
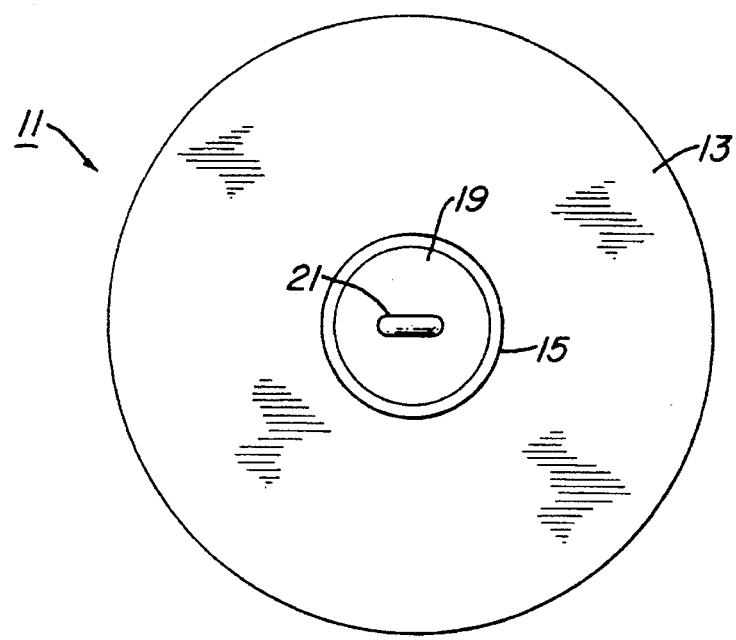
FIG. 3 is a plan view of the anchor according to the present invention.

FIGS. 2 and 3 are elevation and plan views, respectively, of anchor 11 according to the present invention. Anchor 11 comprises a weighted, mushroom-shaped portion 13, which is adapted to engage the bottom of a body of water. Mushroom-shaped anchor portion 13 is preferred for sandy, silty bottoms, which are most typically encountered in fishing situations in which small vessels are anchored. Other configurations may be preferable for different bottom conditions. Anchor portion 13 also possesses sufficient weight to anchor a light fishing vessel against moderate winds and currents, preferably weighing approximately 15 pounds.

A shank 15, in the form of a hollow cylinder, is welded or otherwise secured to and extends from the upper surface of the central portion of anchor portion 13. Shank 15 has a diameter less than anchor portion 13, permitting the periphery of the anchor portion to engage the bottom of a body of water. At least one perforation 17 is formed in the cylindrical wall defined by hollow cylinder 15. A threaded plug g is received in the upper, open end of shank 15 and encloses a bait compartment defined within the interior of shank 15. A ring 21 or similar means is provided on shank 15, preferably welded or otherwise secured to threaded plug 19, for attachment to an anchor line or chain to permit the recovery of anchor 11.

Figure 4:
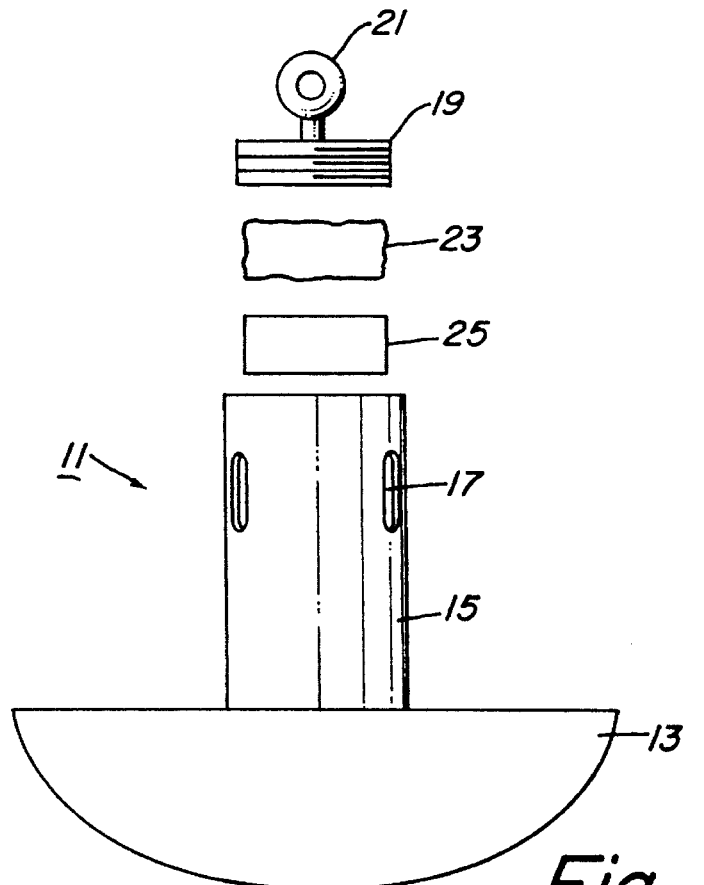
FIG. 4 is an exploded elevation view of the anchor according to the present invention.

FIG. 4 is an exploded elevation view of anchor 11 according to the present invention. As is illustrated, threaded plug 19 provides a removable cap, allowing selective access to the interior or bait compartment of shank 15. Threaded plug 19 may be removed from shank 15 and a quantity of fish-attracting material 23, preferably dough or stink bait, is placed within the hollow interior of shank 15. Threaded plug 19 then is screwed into shank 15 and anchor 11 is ready for use. In addition to dough or stink bait 23, a sponge 25 or other similar absorbent material may be soaked or impregnated with a fish-attracting fluid and disposed within the bait compartment defined within shank 15.

With reference to FIGS. 1–4, the operation of anchor 11 according to the present invention will be described. First, threaded plug 19 is unscrewed from engagement with shank 15, exposing the bait compartment defined within shank 15. Fish-attracting material, in the form of dough or stink bait 23 and/or absorbent material 25 impregnated with fish-attracting fluid, are disposed within the bait compartment. Threaded plug or cap 19 then is screwed into shank 15. An anchor line 7 then is connected to ring 21 and anchor 11 is cast overboard, where it engages bottom 5 of body of water 3 to anchor vessel 1. Perforations 17 in shank 15 permit water to mix with fish-attracting material 23, 25, thereby causing the material to emanate from anchor 11 to attract fish or other aquatic animals. When fish-attracting material 23, 25 is dissipated or when it is desirable to weigh anchor, anchor 11 is retrieved to vessel 1 for refilling or storage. Alternatively, anchor 11 could be used in a body of water surrounding a dock or pier, wherein anchor 11 does not serve to anchor a vessel.

The anchor according to the present invention possesses a number of advantages. A principal advantage is that the present invention provides an anchor with a bait compartment for fish-attracting material that is an integrated object particularly adapted for use aboard light fishing craft or vessels, where space is at a premium.

The invention has been described with reference to a preferred embodiment thereof. It thus not limited, but susceptible to variation and modification without departing from the scope and spirit thereof.

I claim:

1. An apparatus for anchoring a vessel and attracting fish to an area proximate the vessel, the apparatus comprising:
    a weighted portion shaped to engage the bottom of a body of water, the weighted portion having sufficient weight to submerge the apparatus and to anchor a fishing boat against winds and currents;
    an upstanding shank secured to an upper surface of the weighted portion and terminating in means for attachment to an anchor line or chain; and
    a bait compartment formed in the shank to receive a quantity of fish-attracting material and having closure means selectively openable to permit access to the fish-attracting material, the shank being provided with means to permit the fish-attracting material to mix with water when the apparatus is submerged.

2. The apparatus according to claim 1 wherein the weighted portion comprises a mushroom-shaped portion.

3. The apparatus according to claim 1 wherein the shank comprises a hollow cylinder closed at one end by a threaded cap, the interior of the hollow cylinder defining the bait compartment, and a plurality of perforations in the wall of the cylinder to permit the fish-attracting material to mix with water when the apparatus is submerged.

4. The apparatus according to claim 1 further comprising a sponge impregnated with the fish-attracting material and disposed in the bait compartment.

5. An anchor for attracting fish to an area proximal to an anchored vessel, the anchor comprising:
    an anchor portion having an upper surface and a periphery shaped to engage the bottom of a body of water, the anchor portion having sufficient weight to anchor fishing boat against winds and currents;
    a hollow cylinder secured to and extending from the upper surface of the anchor portion and having a diameter less than the periphery of the anchor portion the interior of the cylinder defining bait compartment to receive a quantity of fish-attracting material;
    a removable cap closing the hollow cylinder to secure the fish-attracting material in the bait compartment;
    a ring secured to the hollow cylinder for attachment to an anchor line or chain; and
    at least one perforation in the wall of the hollow cylinder to permit the fish-attracting material to mix with water surrounding the anchor when submerged.

6. The anchor according to claim 5 wherein the anchor portion comprises a mushroom-shaped portion.

7. The apparatus according to claim 5 further comprising a sponge impregnated with the fish-attracting material and disposed in the bait compartment.

8. An submersible apparatus for attracting fish to an area proximate the apparatus, the apparatus comprising:
    a mushroom-shaped portion having a diameter and weight sufficient to submerge the apparatus to and engage the bottom of a body of water to anchor a fishing boat against winds and currents;
    a hollow, cylindrical shank portion extending from a central, upper portion of the mushroom-shaped portion, and having a diameter less than that of the mushroom-shaped portion;
    a threaded cap selectively closing an open end of the shank portion to define a bait compartment within the interior of the shank portion, the bait compartment for receiving a quantity of fish-attracting material;
    at least one perforation in the shank portion to permit water surrounding the apparatus to mix with and distribute the fish-attracting material to the water proximate the submerged apparatus; and
    a ring secured to the threaded cap for attachment to a line or chain for recovery of the apparatus.

9. The apparatus according to claim 8 further comprising a sponge impregnated with fish-attracting material and disposed in the bait compartment.

* * * * *